INPUT SIGNAL TO DIFFERENTIATOR

OUTPUT SIGNAL OF DIFFERENTIATOR

OUTPUT SIGNAL OF LOGARITHMIC CONVERTOR

ERNEST S. GORDON
INVENTOR.

BY

ATTORNEY

United States Patent Office 3,499,160
Patented Mar. 3, 1970

3,499,160
APPARATUS FOR DETERMINING REACTION TIME CONSTANT WITH PHOTOCELL LOGARITHMIC TRANSFER CIRCUIT
Ernest S. Gordon, Saratoga, Calif., assignor to Beckman Instruments, Inc., a corporation of California
Filed Nov. 1, 1967, Ser. No. 679,921
Int. Cl. G01n 21/26
U.S. Cl. 250—218    7 Claims

ABSTRACT OF THE DISCLOSURE

A system for automatically ascertaining the reaction time constant of a chemical reaction with a reaction vessel in which the samples to be reacted are rapidly injected, and radiated with light of a selective wavelength range. A photocell associated with the reaction cell is employed for converting the light rays passing through the reaction vessel into an electrical signal having an amplitude which varies as a function of the absorption of light by the kinetic reaction in the cell. A network including a differentiator circuit and a logarithmic transfer circuit is provided for processing the electrical signal to provide an output signal whose amplitude versus time characteristic is a straight line function with the slope of the line being inversely proportional to the reaction time constant. A temperature compensating network in the form of a parallel resistive network characterized by an appropriate temperature coefficient is associated with the logarithmic transfer circuit to substantially compensate for signal drift due to unpredictable changes in the ambient temperature.

BACKGROUND

Figure 1:
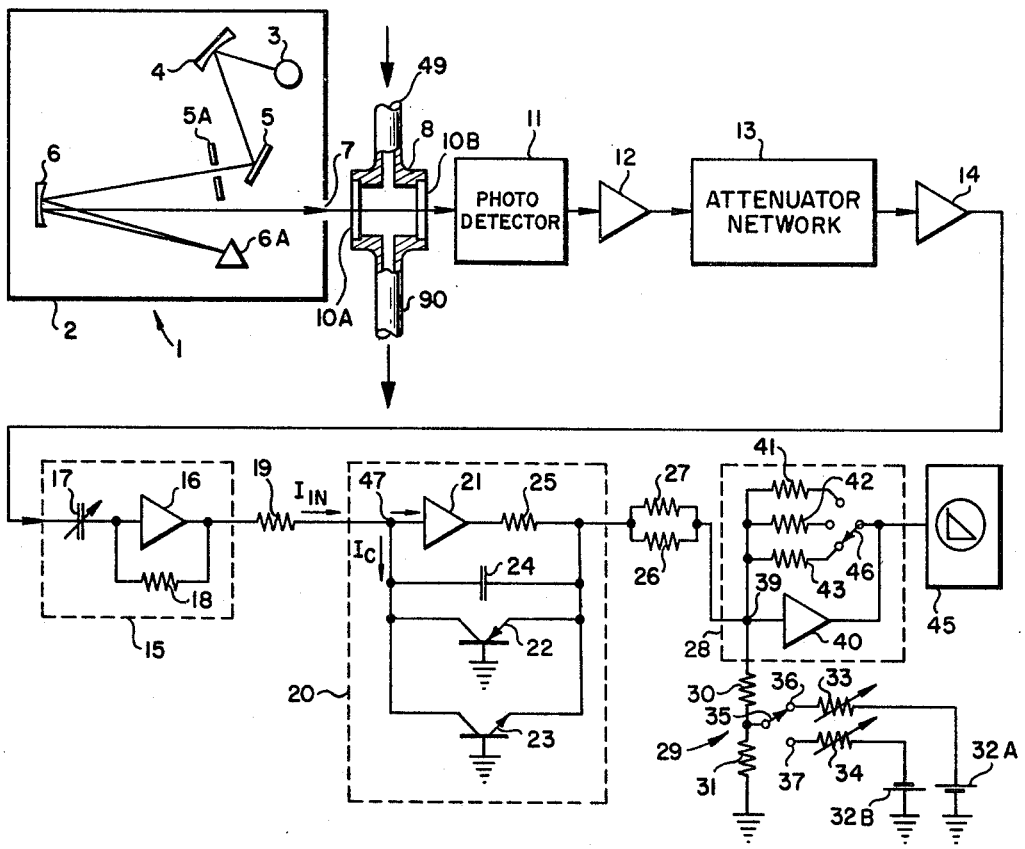

This invention relates in general to photometers and more particularly to spectrophotometer analytical systems used in the study of kinetics of chemical reactions.

Typically the kinetics of a reaction are analyzed by exposing a sample cell containing the chemical constituents being reacted to a source of light and monitoring the intensity of the light transmitted through the sample cell. In other words, since certain characteristics of a kinetic reaction are a function of the absorption properties of the chemical reactants, such characteristics may be determined by monitoring the extent of absorption at a given wavelength of radiation.

In the field of reaction kinetics it is frequently necessary to ascertain the reaction time constant (relaxation time) of the chemical reaction. In the past this constant has been determined by sensing the intensity of the light being transmitted through the sample cell by means of a photoelectric detector to produce an electrical signal having an amplitude which is a function of the transmittance characteristic of the chemical reactants under examination. Since the absorbance is a logarithmic function of the transmittance characteristic, in accordance with Beer's Law, only small absorbance changes are generally employed so as to obtain a linear approximation. Now, if the reaction is first order, as is frequently the case, a logarithmic function is obtained and displayed on an oscilloscope or some other appropriate recording instrument. At this point an observer manually plots the amplitude v. time values of the displayed signal on a semi-log graph to thereby transform the display logarithmic signal into a straight line function. The desired reaction time constant is the reciprocal of the slope of the resultant straight line, i.e., the time duration for a $1/e$ change, appearing on the semi-log graph. Inasmuch as the conversion of the logarithmic signal to a straight line function is performed manually, it is obvious that the present process of determining a reaction time constant of a kinetic chemical reaction is not only cumbersome but, also, time consuming and costly.

SUMMARY

In brief, the present invention contemplates a system for automatically converting an electrical signal whose amplitude is a function of the transmittance characteristic of the chemical reactants contained in the reaction cell directly into an electrical signal whose amplitude versus time characteristic is a straight line function having a slope inversely proportional to the reaction time constant of the chemical reaction. To this end there is provided a reaction cell in which the chemical constituents to be reacted are rapidly mixed and injected. Alternatively, a solution in equilibrium is rapidly perturbed, as, for example, with a temperature or pressure jump, and allowed to relax to the new reaction state. A source of light is disposed on one side of the reaction cell to direct a beam of light, which is monochromatic in nature, through the reaction cell while a photoelectric detector is located on the other side of the reaction cell diametrically opposite to the source of light to sense variances in the intensity of the light beam passing through the reaction cell and provide an electrical output signal having an amplitude which varies in time according to the intensity variations of the impinging light beam. The output signal is then processed by passing it through a differentiator and log converter circuit combination, which operates on the electrical signal to provide an output signal whose amplitude varies with respect to time in a straight line fashion with the slope of the line being inversely proportional to the reaction time constant of the chemical reaction. An additional feature of the present invention is the provision of a temperature compensating means in association with the log converter circuit to accurately compensate for undesired amplitude fluctuations in the output signal as a result of unpredictable changes in the ambient temperature.

Accordingly, it is a primary object of the present invention to overcome the inherent limitations prevalent in the semi-manual system presently employed to derive the reaction time constant of a chemical reaction.

Another object of the present invention is the provision of a system for automatically converting an electrical signal whose amplitude is a function of the transmittance characteristic of the sample being analyzed into an electrical signal whose amplitude varies in time according to a straight line function.

A further object of the present invention is the provision of a system to provide an electrical signal whose amplitude versus time characteristic is a straight line function having a slope inversely proportional to the reaction time constant of a chemical reaction.

Still a further object of the present invention is the provision of a system for easily, rapidly and accurately deriving a signal representing the reaction time constant of a chemical reaction.

A further object of the present invention is the provision of temperature compensating means in combination with a logarithmic converter circuit to compensate for undesired fluctuations in the level of the output signal due to unpredictable temperature changes.

Figure 2:
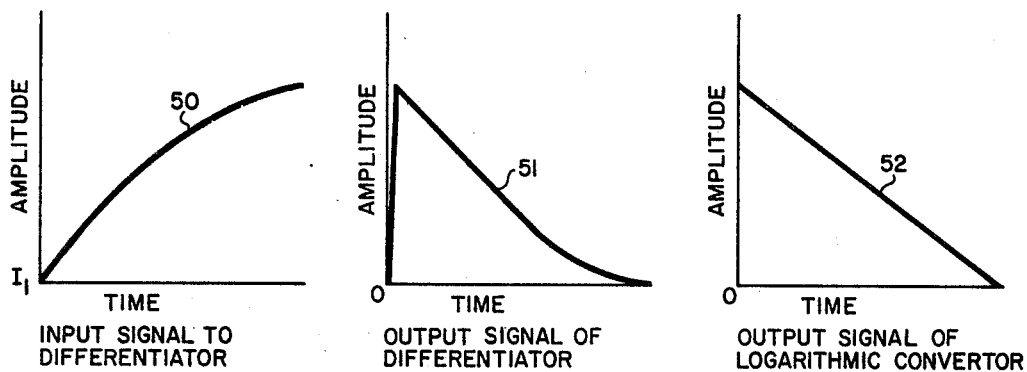

These and other objects and advantages of the invention will become apparent from the following detailed description when read in conjunction with the accompanying drawing in which:

FIG. 1 is a block diagram of the preferred embodiment of the conversion system in accordance with the principles of the present invention; and FIG. 2 is a graphical illustration of signal waveforms occurring at various points in the embodient shown in FIG. 1.

Referring now to the drawings and more particularly to FIG. 1 thereof, it will be observed that the reference numeral 1 designates in general a monochromator including a source of light 3 cooperating with a plurality of mirrors 4, 5 and 6, disposed within a housing 2. Lamp 3 provides a source of light in a broad wavelength range. For example, if radiation in the wavelength range from 300 to 1,000 nanometers is desired a tungsten lamp may be employed while a suitable arc lamp is used in the event radiation within the range from 200 to 400 nanometer wavelengths is preferred. The light beam is reflected by condensing mirror 4 to the reflecting surface of entrance mirror 5 which surface is orientated at approximately a 45° angle with respect to the reflected beam of light to direct the radiant energy through entrance slit 5A and into the monochromator. Collimating mirror 6 gathers the energy reflected by entrance mirror 5 and directs it to a refracting prism 6A. The dispersed energy is reflected back to mirror 6 where it is redirected out the narrow exit slit 7.

The substantially monochromatic light beam emerging from slit 7 passes through a pair of transparent windows 10A and 10B located in opposite side walls of a reaction cell or vessel 8 which reaction cell contains the chemical reactants to be analyzed. For reaction kinetics study the chemical reactants are typically rapidly injected at a predetermined time into the reaction cell 8 by way of an inlet 49 and the variances in the transmission of the light beam through the sample are observed to ascertain the nature of the reaction kinetics taking place. Of course, other techniques may be utilized to disturb the chemical equilibrium of the reactants, such as joule heating or intermitent pressure changes.

The beam of light emerging from the reaction cell 8 impinges upon a photocell 11, which may take the form of a conventional photomultiplier. Photcell 11 responds to the impinging light beam to provide an electrical output signal whose amplitude corresponds to the intensity of the impinging light beam. This electrical signal is fed to an attenuator network 13 by way of amplifier 12. Attenuator network 13 may comprise a plurality of appropriately connected resistive elements which act to vary the sensitivity of the input channel so that the full scale signal amplitude at the differentiator input 15 is substantially constant regardless of the magnitude of change in absorbance obtained in the reaction of the constituents. The output signal from the attenuator network 13 is passed through buffer amplifier 14 and impressed upon an input of a differentiator stage 15.

Differentiator stage 15 includes an operational amplifier 16 in series with a variable capacitor 17 and in parallel with a fedback resistor 18. In practice the capacitance provided by capacitor 17 may be varied in discrete steps so that the level of the signal impressed upon the logarithmic converter 20 is essentially constant over a wide range of reaction time constants.

The output signal from the differentiator circuit 15 is impressed upon an input terminal 47 of a logarithmic converter 20 by way of a resistor 19 which converts the voltage output signal into a current input signal. The logarithmic converter 20 includes an operational amplifier 21 in combination with a feedback circuit comprising a pair of oppositely conductive silicon transistors 22 and 23 connected between the output of operational amplifier 21 and input terminal 47. Transistor 22 is a PNP transistor so as to operate on negative going signals while transistor 23 is connected in an NPN fashion to be responsive to positive going signals. Each transistor is connected in a common base configuration with the bases of both transistors being directly conected to ground. The emitters of both transistors are coupled to the output of the operational amplifier while the collectors of each are directly connected to the input of the operational amplifier at terminal 47. The voltage from the collector to base ($V_{cb}$) of each transistor is held at substantially zero volts. On the other hand, since the emiters of each transistor are coupled to the operational amplifier output, the emitter to base voltage of each transistor is equal to the output of the operational amplifier. By virtue of maintaining the collector-to-base voltage at substantially zero each transistor thereby exhibits a logarithmic transfer function over a relatively large dynamic range. That is to say, the emitter-to-base voltage is a logarithmic function of the short-circuited collector input current, in a manner which will be discussed in more detail hereinafter, over a range of about nine decades. The feedback circuit also includes a resistor 25 which is connected in series with both transistor emitters and a capacitor 24 which is coupled in parallel with the operational amplifier 21 and transistors 22 and 23. This resistor-capacitor combination provides stability of opereation over a wide frequency range.

The signal output of logarithmic converter 20 is coupled to an oscilloscope 45, wherein the signal may be visually displayed, by way of a pair of parallel connected temperature compensating resistors 26 and 27 and an offset-range stage 28. This latter stage 28 includes an operational amplifier 40 having an input terminal 39 upon which the signal from log converter 20 is impressed. A current derived from either voltage source 32A or 32B by way of a voltage dividing network 29 comprising a pair of serially connected resistors 30 and 31 is combined with the signal appearing at input terminal 39. The positive voltage source 32A is connected through a rheostat 33 to a switch 35 while the negative voltage source 32B is connected to switch 35 by way of rheostat 34. Switch 35, which in the illustrated embodiment takes the form of a single pole double throw mechanical switch, may be set on either terminal 36 or terminal 37 to selectively couple the positive or negative offset voltage sources, respectively, to the input 39 of the operational amplifier 40. This DC circuit provides an offset current to counterbalance the peak voltage from the logarithmic stage 20 at the leading edge of the signal pulse.

A feedback network comprising three resistors 41, 42 and 43 is connected between the output of differential amplifier 40 and the input terminal 39. Each resistor in the feedback network offers a different resistive impedance to the feedback signal to enable the signal to be displayed in connection with different logarithmic scales on the oscilloscope 45. In other words, each resistor provides a different scale. For instance, if the scale is defined in terms of the number of centimeters of vertical deflection provided by the oscilloscope as a function of a $1/e$ ratio change, the value of resistors 41, 42 and 43 might be selected to provide signal deflections of 3 centimeters per $1/e$ change, 2 centimeters per $1/e$ change, and 1 centimeter per $1/e$ change, respectively. A mechanical switch 46 is interposed between the resistive feedback network and the operational amplifier output to selectively connect one of the resistors 41, 42 or 43, respectively, into the feedback path according to the desired operating scale. In practice, in the interest of simplicity switches 36 and 46 are incorporated into one overall selector switch.

To facilitate a complete understanding of the operation of the present invention it is believed it would first be appropriate to discuss briefly in mathematical terms the nature of the electrical signal corresponding to the beam of light which passes through the sample cell as well as the characteristics of the signal at various stages throughout the conversion process.

The transmittance characteristic (T) of a sample may be expressed as:

(1) $$T = I/I_o$$

where $I_o$ is the intensity of the light beam impinging upon the sample cell and I is the intensity of light energy from the cell.

In accordance with Beer's Law the transmittance characteristic is a function of the sample concentration in the following manner:

(2) $$T = I/I_o = e^{-BCD}$$

where B is the absorption coefficient of the sample under examination, D is the length of the light path passing through the sample cell (cell width) and C is the concentration of one of the reactants.

The concentration (C) may in turn be expressed as:

(3) $$C = C_o e^{-t/\tau}$$

where $C_o$ is the initial reactant concentration, $t$ is the elapsed time from the beginning of the reaction, and $\tau$ is the chemical reaction time constant.

Substituting the expression for (C) given by Equation 3 into Equation 2 yields:

(4) $$T = I/I_o = e^{-BDC_o e^{-t/\tau}}$$

It can be shown by way of an expansion series that in general $$e^{-n} \cong 1 - n$$

where $n$ is any numerical value $\ll 1$

Thus letting $n = (BCD_o e^{-t/\tau})$, Equation 4 may be simplified to:

(5) $$I/I_o \cong 1 - BDC_o e^{-t/\tau}$$

which rearranged yields:

(6) $$I \cong I_o(1 - BDC_o e^{-t/\tau}) = I_o - I_o BDC_o e^{-t/\tau}$$

Of course, Equation 6 is premised on the product (BDC) being sufficiently small so that the assumption $n \ll |$ is valid, which is true in the majority of cases.

Equation 6 represents the nature of the electrical signal produced by the photocell 11 in terms of amplitude versus time characteristic. Now, it should be noted that after appropriate amplification, if this signal is applied directly to a logarithmic converter circuit, the signal output would be characterized by a non-linear amplitude vs. time characteristic due to the constant term ($I_o$) which is added to the logarithmic term ($BDC_o e^{-t/\tau}$).

However, by differentiating Equation 6 with respect time ($t$), Equation 6 becomes:

(7) $$dI/dt = \frac{I_o BDC_o e^{-t/\tau}}{\tau}$$

Graphically speaking, as opposed to the curve represented by Equation 6, the curve represented by Equation 7 starts at a definite level at time equal to zero and asymptotically approaches zero or the original reference level. In order words, the constant term ($I_o$) is eliminated since its slope is zero.

Now by taking the log of Equation 7:

$$\ln \frac{dI}{dt} = \ln I_o \frac{BDC_o}{\tau} e^{-t/\tau}$$

and expanding:

(8) $$\ln \frac{dI}{dt} = \ln I_o \frac{BDC_o}{\tau} + \ln e^{-t/\tau}$$

$$= \ln \frac{I_o BDC_o}{\tau} - t/\tau$$

It will be recognized that Equation 8 is a linear function of time ($t$) and hence would appear graphically as a straight line with a zero time intercept ($t=0$) of $$\ln \frac{I_o BDC_o}{\tau}$$

and a reciprocal slope of ($-\tau$), wherein $\tau$, as will be recalled, is the reaction time constant of the chemical reaction.

Referring now to FIG. 1, the operation of the preferred embodiment may be best understood in connection with FIG. 2 which graphically depicts signal waveforms at various points throughout the system of FIG. 1.

In a stopped flow experiment, for example, the chemical reactants taking part in the reaction whose reaction time constant (time for $1/e$ change) is to be determined are initially rapidly injected through inlet 49 into the reaction cell 8. Simultaneously therewith a substantially monochromatic beam of light is passed through the cell 8 by means of transparent windows 10 located in opposite walls of cell 8. The intensity of the light beam energy from cell 8 is continuously monitored by photocell 11 which converts the light beam into an electrical signal having an amplitude characteristic corresponding to the intensity of the light beam. The electrical signal provided by photocell 11 is graphically illustrated by a curve 50 in FIG. 2, which shows the signal variances in amplitude over a given time period. As may be readily seen from an inspection of curve 50, the signal provided by photocell 11 begins at an initial level, say $I_1$, and increases in amplitude toward some new value as a function of time in a somewhat exponential fashion with the highest rate of amplitude increase occurring at the beginning (where the slope is substantially linear) followed by a rather rapid decrease in the rate of amplitude change.

After appropriate amplification the electrical signal from photocell 11 is impressed upon differentiator 15 and then fed to input terminal 49 of logarithmic converter circuit 20 by way of resistor 19. In differentiator circuit 15 the signal is differentiated with respect to time to produce an output signal represented by curve 51 of FIG. 2. It should be noted that curve 51 [corresponding to Equation 7] commences at some amplitude level (time substantially zero) and decreases in amplitude as a function of time in an asymptotic manner toward a zero amplitude level with the more rapid rate of decrease in the first portion of the curve corresponding to the greatest degree of slope of curve 50.

Resistor 19 converts the voltage signal provided by differentiator 15 into a current signal which signal is impressed upon input terminal 49. The operation of the logarithmic converter 20 is described in detail in U.S. Patent No. 3,237,028, to J. F. Gibbons, entitled Logarithmic Transfer Circuit and assigned to the present assignee. In brief, at terminal 47 the current signal divides into two paths, one of which leads to operational amplifier 21 and the other of which leads to the collectors of transistors 22 and 23. In the quiescent state no supply or bias voltages are applied to transistor 22 or 23. Upon the occurrence of a current input signal amplifier 21 responds to the applied current signal to impress a voltage signal having an appropriate magnitude and polarity to forward bias one of the transistors 22 or 23 into a given conduction level. For instance, if the signal from differentiator 15 is a negative going signal resulting from an increasing absorbance of one of the constituents during the reaction, a forward bias is applied across the emitter to base circuit of transistor 22 (PNP transistor) by the voltage amplifier 21 to place this transistor into conduction. In this condition the collector-base path appears as a short circuit to the input current at terminal 47. It follows that substantially all of the current appearing at input terminal 47 passes through this short circuit path and hence the input current ($I_{in}$) is substantially equal to the collector current ($i_c$) of the conducting transistor, in this case transistor 22.

As discussed in detail in the aforementioned patent, the transfer relationship between the short circuit collector input current $i_c$ and the emitter to base junction voltage $v_{eb}$ is logarithmic in nature and may be expressed as:

(9) $$i_c = K(e^{qVeb/KT} - 1)$$

where $i_c$ = collector current
$K$ = transistor parameter constant
$e$ = natural logarithm
$q$ = electron charge
$Veb$ = emitter to base voltage
$T$ = temperature, ° K.

taking the log of Equation 9 gives:

(10) $\quad \ln i_c = \ln K(e^{qVeb/KT} - 1)$ since generally speaking $e^{qVeb/KT} \gg 1$, Equation 10 may be expressed as:

$$\ln i_c = \ln K(e^{qVeb/KT}$$

or

(11) $\quad \ln i_c = \ln K + qVeb/KT$

Solving Equation 11 for $Veb$ gives:

(12) $\quad Veb = (\ln i_o - \ln K)\dfrac{KT}{q}$ and since in operation $i_c$ is substantially equal to $I_{in}$:

(13) $\quad Veb = (\ln I_{in} - \ln K)\dfrac{KT}{q}$

Thus, from Equation 13 it is apparent that the output signal provided by operational amplifier 21 is a logarithmic function of the input signal $I_{in}$ appearing at input terminal 47.

This output signal is represented by curve 52 in FIG. 2 which commences at some amplitude level and decreases in amplitude as a function of time in a straight line with the slope of the line being inversely proportional to the reaction time constant $(\tau)$, as shown by Equation 8.

The signal output of logarithmic converter 20 is impressed upon offset-range stage 22 by way of parallel connected resistors 26 and 27, whose function will be discussed in more detail hereinafter. Offset-range stage 28 provides two functions. First, by means of the feedback network including switch 46 and resistors 41, 42 and 43, this stage selects the scale to be used with the display of the signal on oscilloscope 45. Second, by means of the variable voltage applied to the input 39, the difference amplifier 40 provides an initial offset adjustment which corresponds to the value of the time $(t)$ equal zero intercept [see Equation 8] so that the displayed signal begins at an "on scale" point on the oscilloscope. That is, voltage divider network 29, variable resistors 33 and 34, and switch 35 cooperate to provide an offset voltage of the proper polarity to input terminal 39 of operational amplifier 40. For instance, if the signal applied to terminal 39 of operational amplifier 40 is negative going, switch 35 is set on terminal 36 to provide a positive offset voltage to terminal 39 while, on the other hand, if the applied signal is positive going, switch 35 is set on terminal 37 to apply a negative signal to terminal 39. In either case variable resistors 33 and 34 are adjusted so that the voltage applied to amplifier 40 is substantially zero for the predetermined voltage $(v)$ corresponding to the normal full scale excursion at the output of the differentiator 15 and the logarithmic converter 20, respectively.

Another feature of the present invention is the compensation for the inherent signal drift of silicon transistors 22 and 23 due to changes in the ambient temperature which compensation is provided by parallel network formed from resistors 26 and 27. Referring back to Equation 13 it will be observed that the output voltage $(V_{eb})$ of the logarithmic converter circuit 20 is directly proportional to the ambient temperature T. As a consequence, if the output signal is to be a sole function of the collector current $(i_c)$, as desired, some compensation for signal drift on account of temperature variances must be provided. For example, a temperature variance of between 30° and 35° centigrade (C) from room temperature causes a signal error of around 1.67%. In other words, transistors 22 and 23 have a positive $(V_{eb})$ temperature coefficient of about 0.33%/° C. wherein the temperature coefficient is defined as the percentage variance in the level of the output signal per degree centigrade change in the surrounding temperature.

To compensate for this inherent signal drift due to temperature variance either resistor 26 or 27 is characterized by an appropriate positive temperature coefficient.

In the illustrated embodiment it may be shown that the voltage gain $(A_v)$ of the differential amplifier 40 may be expressed as:

$$A_v \cong -\dfrac{R_o}{R_1}$$

where $R_o$ = resistance in feedback network (either resistor 41, 42 or 43 depending upon setting of switch 46)
$R_1$ = equivalent resistance of parallel resistive network formed from resistors 26 and 27.

Thus, from the above expression it is apparent that, regardless of the particular operating range employed, as dictated by the selected resistor, the gain is an inverse function of the equivalent resistance $R_1$. Since the temperature T is a direct function of the voltage $Veb$ (see Equation 13) a positive resistive temperature coefficient (TC) of the parallel resistor network is required to compensate for the temperature drift characteristics of the transistor.

To this end, one of the resistors 26 or 27 has a positive temperature coefficient of 0.7%/° C. (a commercially available component) while the other resistor has none. Since resistors 26 and 27 are connected in parallel the overall network temperature coefficient is 0.35/° C., which substantially compensates for the positive temperature coefficient of 0.33/° C. exhibited by the transistor included in the feedback of logarithmic circuit 20. In practice it has been found that this arrangement results in a tracking error of less than one percent over a 30° C. temperature range.

Numerous modifications and departures from the specific apparatus described herein may be made by those skilled in the art without departing from the inventive concept of the invention. For instance, the parallel temperature compensating resistive network may be replaced by a series resistor having an equivalent resistance. Also, it may be shown that the linear approximation to Beer's Law [Equation 6] holds true only if the initial absorbance (.433 $BDC_o$) is less than about .1, which, as previously discussed, is the case in most instances. On the other hand, for those cases in which the initial absorbance is greater than .1 the linear approximation to Beer's Law cannot be used without excessive error. However, by inserting a logarithmic converter between photocell 11 and preamplifier 12 the electrical signal will follow Beer's Law for absorbances well above .1 as well as below and no errors would result when the reaction absorbance is greater than about .1. Thus, by modifying the circuit in this manner the circuit may accurately monitor a wide range of reaction absorbances without being subject to errors arising from Beer's Law. Accordingly, the invention is to be construed as limited only by the spirit and scope of the appended claims.

What is claimed is:

1. A system for ascertaining the reaction time constant of a chemical reaction comprising:

a reaction cell for containing the samples to be reacted,
   means for emitting radiation toward said reaction cell,
   means responsive to radiation transmitted through the reaction cell to provide a first electrical output signal having an amplitude which varies as a function of the intensity of the impinging radiation, and
   means for processing said first output signal to provide a second output signal whose amplitude versus time slope is a function of the reaction time constant of the chemical reaction.

2. A system as defined in claim 1 wherein the amplitude versus time slope of said second output signal is a linear function of the reaction time constant of the chemical reaction.

3. A system for automatically determining the reaction time constant of a chemical reaction comprising:

a cell for containing the samples to be reacted, a source of light for emitting radiation in a selected wavelength range toward said reaction cell, means responsive to radiation transmitted through the reaction cell to provide a first electrical output signal having an amplitude which varies as a function of the intensity of the impinging light, means to differentiate said first output signal with respect to time to provide a second output signal, and means responsive to said second output signal to provide a third output signal whose amplitude varies as a function of time in a straight line fashion with the slope of the line being an inverse function of the reaction time constant of the chemical reaction.

4. A system as defined in claim 3 wherein the means for providing said third output signal comprises a logarithmic transfer circuit responsive to the second output signal to provide a third output signal which is a logarithmic function of the applied input signal.

5. A system as defined in claim 3 comprising in addition means for displaying said third output signal.

6. A system as defined in claim 5 comprising in addition circuit means interposed between said display means and the logarithmic converter means to process said third output signal so that the displayed signal commences at an on scale point on the display means.

7. A system as defined in claim 6 wherein said latter circuit means includes means to select the appropriate scale to be used in connection with the display of the third output signal on said display means.

References Cited
UNITED STATES PATENTS

| | | | |
|---|---|---|---|
| 3,109,103 | 10/1963 | Wilhemsen | 328—145 |
| 3,237,028 | 2/1966 | Gibbons | 307—230 |
| 3,266,504 | 8/1966 | Sundstrom | 328—145 |
| 3,329,836 | 7/1967 | Pearlman et al. | 328—145 |

RALPH G. NILSON, Primary Examiner

MARTIN ABRAMSON, Assistant Examiner

U.S. Cl. X.R.

328—145